Figure 5:
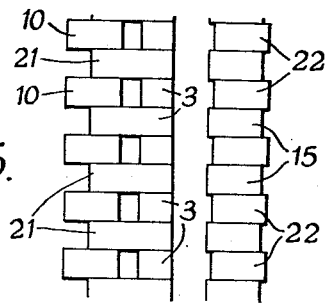
Figure 6:
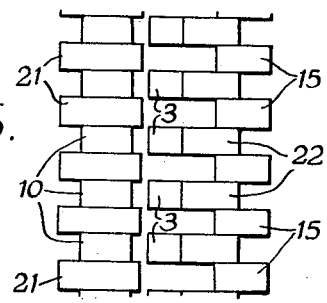

June 18, 1957 P. J. SHORT 2,795,964
ROTARY POWER TRANSMISSION MECHANISMS
Filed March 1, 1954 4 Sheets-Sheet 1
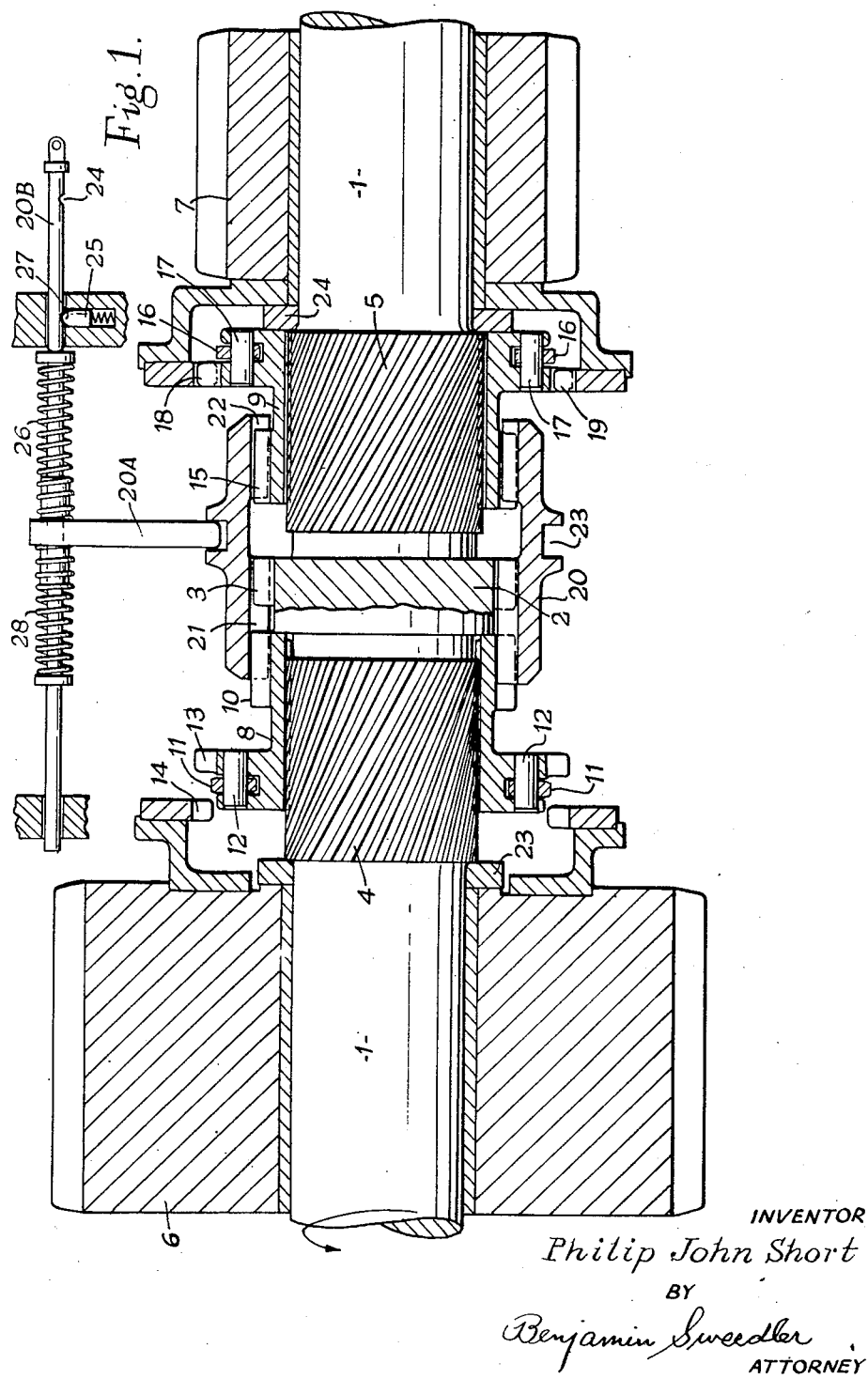
INVENTOR
Philip John Short
BY
Benjamin Sweedler
ATTORNEY

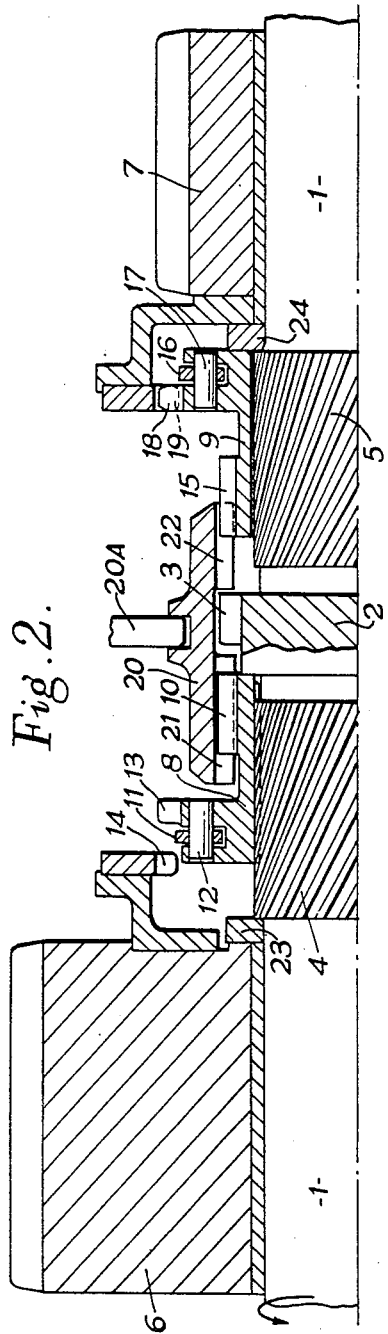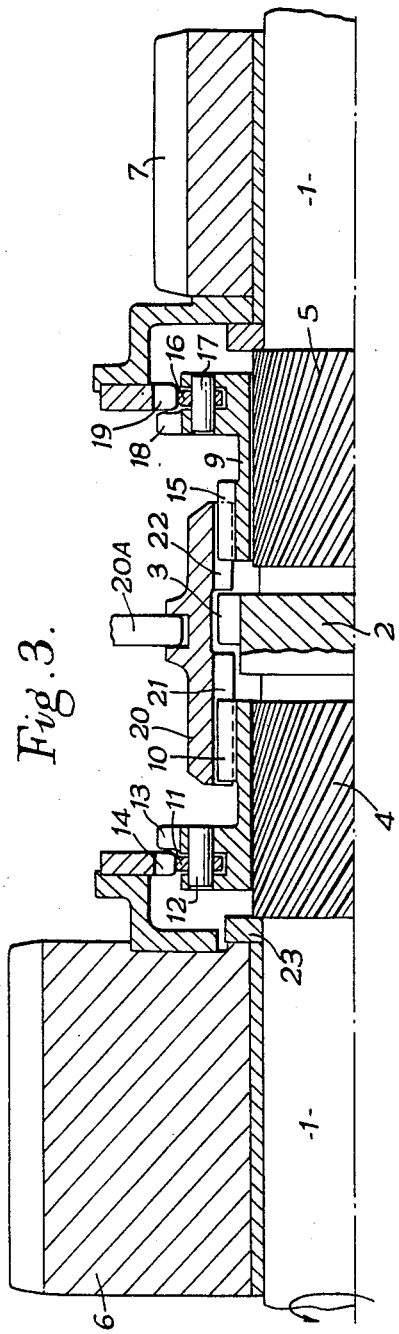

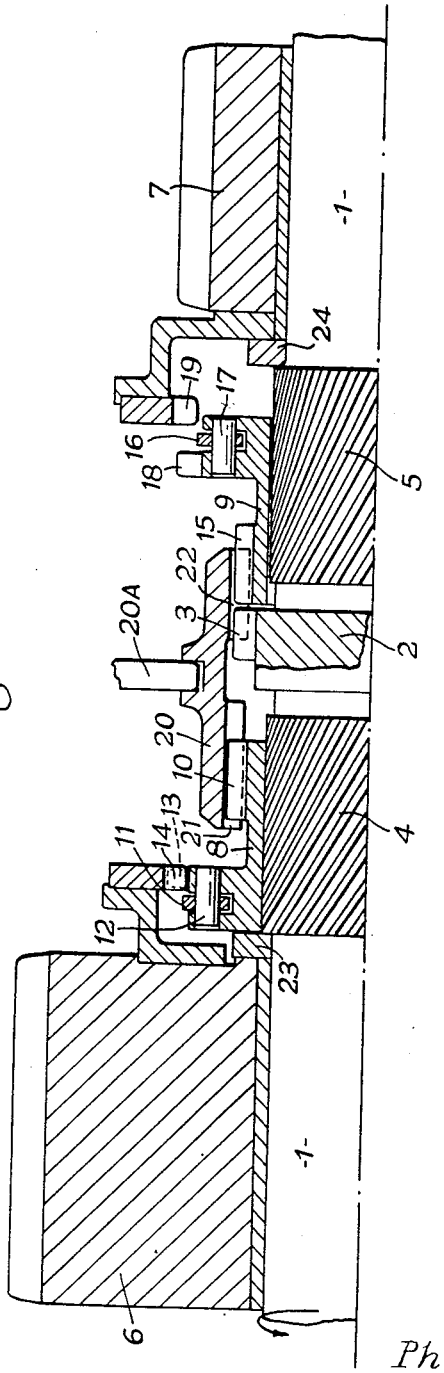

June 18, 1957     P. J. SHORT     2,795,964
ROTARY POWER TRANSMISSION MECHANISMS
Filed March 1, 1954     4 Sheets-Sheet 4

INVENTOR
Philip John Short
BY
Benjamin Sweedler
ATTORNEY

United States Patent Office 2,795,964
Patented June 18, 1957

2,795,964
ROTARY POWER TRANSMISSION MECHANISMS

Philip John Short, Wokingham, England, assignor to S. S. S. Gears Limited, Isleworth, Middlesex, England Application March 1, 1954, Serial No. 413,249

Claims priority, application Great Britain March 2, 1953

7 Claims. (Cl. 74—339)

This invention relates to rotary power transmission mechanisms, wherein means are provided for clutching a first rotary member alternatively to one or other of second and third rotary members, and wherein means are provided for automatically effecting driving engagement between the first member and the selected one of the second and third rotary members when relative angular movement in the appropriate sense tends to take place between the said first member and the selected other one of the rotary members.

The object of the present invention is to provide mechanism of the type described which has advantages over mechanisms of this type as previously employed or proposed.

According to the invention there is provided rotary power transmission mechanism comprising a first rotary member, second and third rotary members coaxial with said first member, and means for automatically coupling said first member to said second member when one of said first and second members tends to overrun the other in one direction, means for alternatively automatically coupling said first member to said third member when one of said first and third members tends to overrun the other in one direction, and means, including a control member axially movable on said first member, for selectively locking said first member in engagement with said second member or with said third member.

In order that the invention may be clearly understood and readily carried into effect it will now be described in more detail with reference to the accompanying drawings in which:

Figure 1 is a view in longitudinal section of change speed gearing incorporating the invention, Figures 2, 3 and 4 are sectional views of the upper part of the gearing and illustrate the change over from high speed condition to low speed condition, and Figures 5 to 8 are development views corresponding respectively to Figures 1 to 4.

Referring to the drawings, the above-mentioned first rotary member is formed by a shaft 1 provided with a flange 2 formed with a ring of uniformly spaced dogs 3, and provided also with first and second sets of helical splines 4 and 5, the two sets of helical splines being of the same steep pitch and being both right-handed. At the side of the first helical splines 4 remote from the dogs 3 a low speed gear wheel 6 is mounted on the shaft 1 on a plain journal, and at the side of the second set of helical splines 5 remote from the dogs 3 a high speed gear wheel 7 is mounted on the shaft 1, also on a plain journal. The low and high speed gear wheels 6 and 7 are respectively the above-mentioned second and third rotary members. On the first set of helical splines 4 is mounted a first intermediate member in the form of a nut 8 which is provided with internal helical splines engaged with the helical splines 4, so that the nut 8 is constrained to move helically on the shaft 1. A second intermediate member in the form of a second nut 9 is also constrained to move helically on the shaft, being provided with internal helical splines which are engaged with the helical splines 5. The nut 8 is provided with a ring of uniformly spaced short axial splines 10, and with pawls 11 mounted on pivot pins 12, and with a ring of male jaw clutch teeth 13. The low speed gear wheel 6 is provided with a ring of internal jaw clutch teeth 14. The nut 9 is provided with a ring of uniformly spaced short axial splines 15, and with pawls 16 mounted on pivot pins 17, and also with a ring of male jaw clutch teeth 18. The high speed gear wheel 7 is provided with a ring of internal jaw clutch teeth 19. The pawls 11 on the nut 8 have their noses directed oppositely to the noses of the pawls 16 of the nut 9. Looking along the shaft 1 from the left-hand end as seen in Figure 1, the pawls 11 have their noses directed clockwise, and the pawls 16 have their noses directed counter-clockwise.

The mechanism includes a control sleeve 20 having a first set of axial splines 21 continuously engaged with the axial splines 10 on the nut 8, and a second set of axial splines 22 continuously engaged with the axial splines 15 of the nut 9. The angular spacing and width of the axial splines on the nuts 8 and 9 and on the control sleeve 20 is similar to the angular spacing and width of the shaft dogs 3.

The function of the control sleeve 20 is to lock the shaft dogs 3 selectively to either of the nuts 8 and 9, for the transmission of torque to the output shaft 1 from gear wheels 6 and 7 respectively. The control sleeve 20 is operated by means of a selector fork 20A engaged with a groove 23 in the control sleeve, the fork 20A being slidably mounted on a selector rod 20B and connected to it through a double acting spring link (see for example Figure 1 of patent specification No. 2,245,017).

The gear wheels 6 and 7 will be assumed to be engaged respectively with two pinions fixed on a driving shaft which will be assumed by way of example to be the output shaft of an engine, the shaft 1 accordingly being the driven or output shaft of the mechanism.

The mechanism is shown in Figure 1 as set in the high speed position (see also Figure 5). In this position, the jaw clutch teeth 16 of the nut 9 are engaged with the internal jaw clutch teeth 19 of the high speed gear wheel 7, and the control sleeve 20 is in an axial position such that its splines 21 are engaged with the dogs 3 on the output shaft 1. Since the axial splines 22 of the control sleeve 20 are engaged with the axial splines 15 of the nut 9, the latter is prevented from moving helically on the output shaft 1 and is therefore locked against movement out of driven engagement with the high speed gear wheel 7. The high speed gear wheel 7 is thus drivably coupled bi-directionally to the output shaft, which will be assumed to rotate in counter-clockwise direction looking at the mechanism from the left of Figure 1, as indicated by the arrow. The nut 8 is in a "pawl free" position in which the pawls 11 thereon are axially spaced from the jaw clutch teeth 14 of the low speed gear wheel 6, being retained in this position by the engagement of the splines 21 on the control sleeve with the splines 10 on the nut 8.

Figure 7:
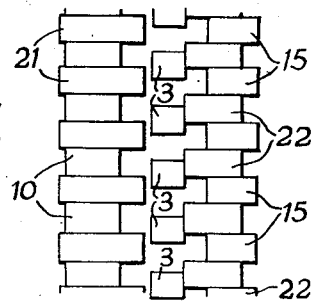

When it is desired to change from high speed to low speed, low speed is selected by moving the selector rod 20B to the left until the notch 24 therein is engaged by the detent 25, so that the spring 26 is compressed and the fork 20A tends to move the control sleeve 20 to the left. So long as appreciable torque is being transmitted via the high speed gear wheel 7 through the engaged splines 15, 22, and 21, 3 the control sleeve 20 will not move axially. When the driving torque is interrupted, as by closing the throttle of the engine, the control sleeve 20 is relieved from load and moves to the left under the action of the compressed spring link, until its right-hand splines 22 abut against the right-hand ends of the shaft dogs 3, which are so disposed angularly (see Figures 2 and 6) as to baulk the control sleeve 20 under the conditions as so far described. This movement of the control sleeve 20 brings its left-hand set of axial splines 21 out of engagement with the shaft dogs 3, so that there is now no rotational lock between the nuts 8 and 9 on the one hand and the shaft 1 on the other hand, and the nuts 8 and 9 are capable of moving helically on the respective splines 4 and 5 with respect to the shaft 1. Driving torque is now restored by opening the engine throttle, thereby causing the nut 9 to screw to the left along the shaft 1 until its jaw clutch teeth 18 are out of engagement with the jaw clutch teeth 19 of the high speed gear wheel 7, and its pawls 16 are in ratchetting engagement with these teeth 19. Since the two nuts 8 and 9 are coupled for angular movement by the control sleeve 20, the angular movement of the nut 9 when screwing to the left causes the nut 8 also to screw to the left, thereby bringing the pawls 11 of the nut 8 into ratchetting engagement with the jaw clutch teeth 14 of the low speed gear wheel 6 (Figures 3 and 7). Due to the applied driving torque the low speed gear wheel 6 is accelerating, and as soon as it tends to overrun the shaft 1 a pawl 11 of the nut 8 is engaged by a jaw clutch tooth 14 of the low speed gear wheel 6 and the nut 8 is thereby screwed to the left against an axial stop 23 so as to bring its jaw clutch teeth 13 into engagement with the jaw clutch teeth 14 of the low speed gear wheel 6. The angular movement of the nut 8 in screwing to the left causes the nut 9 to execute a similar angular movement so that it also screws to the left to a "pawl free" position, in which its pawls 16 are out of ratchetting engagement with the jaw clutch teeth of the high speed gear wheel 7. The mechanism is now engaged in low gear, but is not yet locked in this condition.

Figure 8:
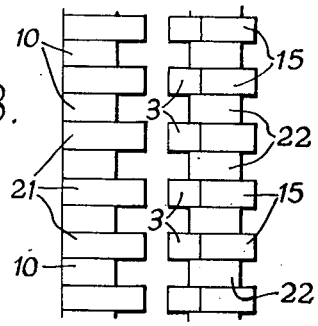

The angular movement of the control sleeve 20 due to the last-mentioned screwing of the nuts 8 and 9 to the left brings the splines 22 on the control sleeve 20 opposite the spaces between the shaft dogs 3, so that the control sleeve 20 can now move axially to the left under the action of the compressed spring link, bringing the splines 22 on the control sleeve 20, which are continuously engaged with the splines 15 on the nut 9, into meshing engagement with the shaft dogs 3. This condition of the mechanism is represented in Figures 4 and 8. The nut 8, which is screwed against its axial stop 23 by driving torque, is thus prevented from moving to the right under the action of overrunning torque, and the mechanism is therefore locked in low gear.

When with the throttle open and engine torque being transmitted to the output shaft 1 via the low speed gear wheel 6, it is desired to change from low to high gear, the selector rod 20B is moved to the right until its notch 27 is engaged by the detent 25, thereby compressing spring 28 so that the fork 20A moves the control sleeve 20 to the right, such movement being free to take place so long as driving torque is being transmitted via the left-hand nut, which as stated is screwed against its axial stop 23 by the driving torque. The movement of the control sleeve 20 to the right continues until its splines 22 are disengaged from the shaft dogs 3, and its splines 21 are baulked by the ends of the shaft dogs 3. The nuts 8 and 9 are then free to move angularly with respect to the shaft 1, and when the throttle is closed and the driving torque ceases the output shaft 1 overruns the low speed gear wheel 6 and the nut 8 screws to the right to bring its jaw clutch teeth 13 out of engagement with the jaw clutch teeth 14 of the low speed gear wheel 6 and to bring its pawls 11 into ratchetting engagement with the jaw clutch teeth 14. The angular movement of the nut 8 causes a similar angular movement to be executed by the right-hand nut (due to the nuts being coupled for angular movement by the control sleeve 20), which therefore screws to the right to bring its pawls 16 into ratchetting engagement with the jaw clutch teeth 19 of the high speed gear wheel 7. The engine speed continues to decrease, due to the throttle being closed, and when the output shaft 1 tends to overrun the high speed gear wheel 7 a pawl 16 of the nut 9 is engaged by a jaw clutch tooth 19 of the high speed gear wheel 7 and the nut 9 is screwed to the right against an axial stop 24, in which position its jaw clutch teeth 16 are engaged with those of the high speed gear wheel 7. This movement of the nut 9 causes the nut 8 to screw further to the right to the "pawl free" position, and also causes the control sleeve 20 to move angularly so as to bring its splines 21 opposite the spaces between the shaft dogs 3. Accordingly, the control sleeve 20 moves to the right under the action of the spring link so that its splines 21 are engaged with the shaft dogs 3. The nut 9 is therefore unable to screw along the shaft to the left when driving torque is restored, and the mechanism is therefore locked in high gear (Figures 1 and 5).

A slight degree of angular play is desirably permitted between the splines 21 of the control sleeve 20 and the shaft dogs 3 such that when the throttle is opened to restore driving torque the nut 9 screws slightly to the left. Then when the driving torque is interrupted for changing to low gear, the overrunning torque causes the nut 9 to move to the right against its stop 24, thereby ensuring that the control sleeve 20 is relieved of load.

The conditions are favourable to the use of plain journal bearings, since when load is being transmitted the operative gear wheel 6 or 7 does not rotate with respect to the shaft 1, hence there is no relative rotation on the bearing when it is loaded. Conversely, when there is relative rotation, the bearing is not loaded.

I claim:

1. Rotary power transmission mechanism comprising a first clutch member, second and third clutch members coaxial with said first clutch member and provided with jaw clutch teeth, a first intermediate member constrained for helical movement on said first member into and out of clutching engagement with said second clutch member, at least one projection provided on said first intermediate member for cooperation with the teeth of said second clutch member to effect said clutching engagement automatically when one of said first and second clutch members tends to overrun the other of said first and second clutch members in one direction, a second intermediate member constrained for helical movement on said first clutch member into and out of clutching engagement with said third clutch member, at least one projection provided on said second intermediate member for cooperation with the teeth of said third member to effect said last-mentioned clutching engagement automatically when one of said first and third clutch members tends to overrun the other of said first and third clutch members in one direction, and coupling means constraining said first and second intermediate members for conjoint angular movement, the teeth of said second and third clutch members respectively and said first and second intermediate members being spaced axially of the mechanism to the extent that helical movement of either of said intermediate members to its position of clutching engagement causes an angular movement of said coupling means which angular movement causes helical movement of the other of said intermediate members to an axial position in which the said projections on said other intermediate member are out of contact with the clutch teeth of the associated one of said second and third clutch members.

2. Rotary power transmission mechanism as set forth in claim 1, wherein said projections are constituted by pawls on said first and second intermediate members.

3. Rotary power transmission mechanism as set forth in claim 1, wherein said first and second intermediate members are each provided with splines and said first clutch member is provided with locking dogs, and wherein said coupling means comprise a control sleeve having a first set of splines engaged with the splines of said first intermediate member and engageable with said dogs on said first member when said second intermediate member is clutched to said third clutch member, and having a second set of splines engaged with the splines of said second intermediate member and engageable with said dogs when said first intermediate member is clutched to said second clutch member.

4. Rotary power transmission mechanism comprising a first clutch member, second and third clutch members coaxial with and spaced from one another in the direction of the axis of said mechanism, and said second and third clutch members having jaw clutch teeth, a first intermediate member provided with jaw clutch teeth and constrained for helical movement on said first clutch member whereby to bring its teeth into and out of engagement with the teeth of said second clutch member, a first ratchet drive for effecting synchronous toothed engagement of said first intermediate member with said second clutch member, a second intermediate member provided with jaw clutch teeth and constrained for helical movement on said first clutch member whereby to bring its teeth into and out of engagement with the teeth of said third clutch member, a second ratchet drive for effecting synchronous toothed engagement of said second intermediate member with said third clutch member, locking dogs on said first clutch member, and a control sleeve that serves to couple said first and second intermediate members for conjoint angular movement and is engageable with and disengageable from said locking dogs, the axial spacing of the jaw clutch teeth of said second and third clutch members and of said first and second intermediate members, being such that tooth engagement of said first intermediate member with said second clutch member is alternative to toothed engagement of said second intermediate member with said third clutch member, and helical movement of either of said intermediate members to its position of toothed engagement with the associated one of said second and third clutch members causes an angular movement of said control sleeve, which angular movement causes helical movement of the other of said intermediate members to a position wherein the ratchet drive associated with said other intermediate member is out of ratchetting engagement.

5. Rotary power transmission mechanism as set forth in claim 4, wherein said first and second intermediate members are each provided with splines and said control sleeve is provided with a first set of splines engaged with the splines of said first intermediate member, and with a second set of splines engaged with the splines of said second intermediate member, the locking dogs on said first clutch member being positioned so that they axially balk said first set of splines on said control sleeve except when said second intermediate member is in toothed engagement with said third clutch member, and that they axially balk said second set of splines on said control sleeve except when said first intermediate member is in toothed engagement with said second clutch member.

6. Rotary power transmission mechanism as set forth in claim 4, comprising means for resiliently urging said control sleeve to a position in which said first set of splines on said control sleeve is balked by said locking dogs and, alternatively, to a position in which said second set of splines on said control sleeve is balked by said locking dogs.

7. Change speed gearing comprising a shaft, first and second gear wheels associated respectively with power paths of different transmission ratios, said gear wheels being arranged coaxially with said shaft, jaw clutch teeth on said first gear wheel, a first intermediate member provided with jaw clutch teeth and constrained for helical movement on said shaft whereby to bring its jaw clutch teeth into and out of engagement with the jaw clutch teeth of said first gear wheel, a ratchet drive, comprising at least one pawl carried by said first intermediate member, for effecting synchronous engagement of said first intermediate member with said first gear wheel, a second intermediate member provided with jaw clutch teeth and constrained for helical movement on said first member whereby to bring its jaw clutch teeth into and out of engagement with the jaw clutch teeth of said second gear wheel, a ratchet drive, comprising at least one pawl, carried by said second intermediate member for effecting synchronous toothed engagement of said second intermediate member with said second gear wheel, first and second sets of axial splines provided respectively on said first and second intermediate members, locking dogs on said shaft, a control sleeve provided with a first set of axial splines engaged with the axial splines on said first intermediate member and engageable with said locking dogs when said second intermediate member is in toothed engagement with said second gear wheel, said control sleeve having a second set of axial splines engaged with the axial splines on said second intermediate member and engageable with said locking dogs when said first intermediate member is in toothed engagement with said first gear wheel, said control sleeve coupling said first and second intermediate members for conjoint angular movement whereby toothed engagement of said first intermediate member with said first gear wheel is alternative to toothed engagement of said second intermediate member with said second gear wheel, and said ratchet mechanisms being provided in axial positions relative to their associated intermediate members such that when either intermediate member is in toothed engagement with the associated gear wheel the ratchet drive associated with the other intermediate member is in a non-ratchetting axial position with respect to the jaw clutch teeth of the gear wheel associated with said other intermediate member.

References Cited in the file of this patent

UNITED STATES PATENTS

| | | |
|---|---|---|
| 2,224,322 | Sinclair | Dec. 10, 1940 |
| 2,515,114 | Chilton | July 11, 1950 |

FOREIGN PATENTS

| | | |
|---|---|---|
| 389,642 | Great Britain | Mar. 23, 1933 |